United States Patent
Wu et al.

(10) Patent No.: US 12,341,588 B2
(45) Date of Patent: Jun. 24, 2025

(54) FREQUENCY DOMAIN BASIS RESTRICTION FOR CSI REPORTING ENHANCEMENT

(71) Applicant: QUALCOMM Incorporated, San Diego, CA (US)

(72) Inventors: Liangming Wu, Beijing (CN); Chenxi Hao, Beijing (CN); Qiaoyu Li, Beijing (CN); Min Huang, Beijing (CN); Yu Zhang, San Diego, CA (US); Wanshi Chen, San Diego, CA (US); Chao Wei, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 417 days.

(21) Appl. No.: 17/597,617

(22) PCT Filed: Aug. 21, 2020

(86) PCT No.: PCT/CN2020/110511
§ 371 (c)(1),
(2) Date: Jan. 13, 2022

(87) PCT Pub. No.: WO2021/032191
PCT Pub. Date: Feb. 25, 2021

(65) Prior Publication Data
US 2022/0255604 A1 Aug. 11, 2022

(30) Foreign Application Priority Data
Aug. 21, 2019 (WO) ............... PCT/CN2019/101708

(51) Int. Cl.
*H04B 7/06* (2006.01)
*H04L 1/1607* (2023.01)
*H04L 5/00* (2006.01)

(52) U.S. Cl.
CPC ......... *H04B 7/0626* (2013.01); *H04B 7/0639* (2013.01); *H04L 1/1614* (2013.01); *H04L 5/0094* (2013.01)

(58) Field of Classification Search
CPC .... H04B 7/0639; H04B 7/048; H04B 7/0626; H04B 17/336; H04B 7/0417;
(Continued)

(56) References Cited

U.S. PATENT DOCUMENTS 12,040,859 B2 * 7/2024 Zhang ................... H04B 7/046
2012/0057482 A1 * 3/2012 Geirhofer ............. H04L 1/0026
370/252
(Continued)

FOREIGN PATENT DOCUMENTS

| CN | 109560842 A | 4/2019 |
|---|---|---|
| WO | 2016124361 A1 | 8/2016 |
| WO | 2019057073 A1 | 3/2019 |

OTHER PUBLICATIONS

Apple: "Considerations on CSI Enhancement for MU-MIMO Support", 3GPP Draft, 3GPP TSG RAN WG1 #97, R1-1907341, Reno, USA, May 13-17, 2019, May 4, 2019, pp. 1-6, Section 2-3.
(Continued)

*Primary Examiner* — Wutchung Chu
(74) *Attorney, Agent, or Firm* — Arent Fox, LLP / Qualcomm

(57) ABSTRACT

The frequency domain basis may be fed back in a CSI report from a user equipment (UE), with extra overhead and computation cost. In an aspect of the disclosure, a method, a computer-readable medium, and an apparatus are provided. The apparatus may be a UE configured to receive, from a base station, CSI reference signals (CSI-RS). The apparatus may be further configured to receive, from the base station, a configuration including a frequency domain basis restriction indicating a frequency domain basis subset,
(Continued)

where the frequency domain basis subset is selected from a frequency domain basis set. The apparatus may be configured to prepare, upon receiving the frequency domain basis restriction, a CSI report based on the CSI-RS and the frequency domain basis subset. The apparatus may be further configured to transmit the CSI report to the base station.

24 Claims, 13 Drawing Sheets

(58) Field of Classification Search
CPC .. H04B 7/0456; H04B 7/0632; H04B 7/0634; H04B 7/0645; H04L 5/0023; H04L 5/0094; H04L 1/1614; H04L 5/0005; H04L 5/0007; H04L 5/001; H04L 5/0053; H04L 5/0048; H04L 5/0055; H04L 5/0057; H04L 1/0026; H04L 5/003; H04L 5/0051; H04L 5/005; H04W 4/70; H04W 72/0446; H04W 72/12; H04W 72/23; H04W 72/30
See application file for complete search history.

(56) References Cited

U.S. PATENT DOCUMENTS

| | | | | |
|---|---|---|---|---|
| 2013/0196675 A1* | 8/2013 | Xiao | ............... | H04W 72/541 455/452.1 |
| 2013/0272250 A1* | 10/2013 | Shimezawa | ......... | H04B 7/0639 370/329 |
| 2013/0315185 A1* | 11/2013 | Kim | ..................... | H04W 72/20 370/329 |
| 2013/0336214 A1* | 12/2013 | Sayana | ................. | H04L 5/0048 370/328 |
| 2014/0241450 A1* | 8/2014 | Prasad | ................. | H04B 7/0626 375/267 |
| 2015/0180625 A1* | 6/2015 | Park | ...................... | H04B 7/024 370/329 |
| 2015/0271814 A1* | 9/2015 | Park | ..................... | H04W 72/23 370/329 |
| 2016/0204842 A1* | 7/2016 | Song | ................... | H04B 7/0478 375/267 |
| 2016/0233938 A1 | 8/2016 | Mondal et al. | | |
| 2016/0248492 A1* | 8/2016 | Prasad | ................... | H04B 7/065 |
| 2016/0329937 A1* | 11/2016 | Shi | ........................ | H04B 7/046 |
| 2018/0098235 A1* | 4/2018 | Bagheri | ................ | H04W 72/20 |
| 2018/0198497 A1* | 7/2018 | Wei | ...................... | H04B 7/0639 |
| 2018/0220422 A1* | 8/2018 | Bhattad | ................ | H04L 5/0064 |
| 2018/0323846 A1* | 11/2018 | Tsai | ..................... | H04B 7/0617 |
| 2018/0343046 A1* | 11/2018 | Park | ..................... | H04W 76/27 |
| 2020/0053764 A1* | 2/2020 | Kim | .................. | H04W 72/0453 |
| 2020/0186207 A1* | 6/2020 | Davydov | ............. | H04B 7/0469 |
| 2020/0212974 A1* | 7/2020 | Wu | ....................... | H04L 5/0051 |
| 2020/0220591 A1* | 7/2020 | Zhang | .................... | H04B 7/046 |
| 2021/0067222 A1* | 3/2021 | Yang | .................... | H04W 72/53 |
| 2021/0288705 A1* | 9/2021 | Lee | ...................... | H04B 17/373 |
| 2022/0038145 A1* | 2/2022 | Gao | ..................... | H04B 7/0482 |
| 2022/0183079 A1* | 6/2022 | Ouchi | .................. | H04W 16/14 |
| 2022/0255604 A1* | 8/2022 | Wu | ....................... | H04L 1/1614 |
| 2022/0287059 A1* | 9/2022 | Huang | ............... | H04W 52/146 |

OTHER PUBLICATIONS

Ericsson: "On CSI Enhancements for MU-MIMO", 3GPP Draft, 3GPP TSG RAN WG1 Meeting RAN1#97, R1-1907074, On CSI Enhancements for MU-MIMO, 3rd Generation Partnership Project (3GPP), Mobile Competence Centre, 650 Route Des Lucioles, F-06921 Sophia-Antipolis Cedex, France, vol. RAN WG1, No. Reno, US, May 13, 2019-May 17, 2019, May 13, 2019 (May 13, 2019), XP051728520, 19 Pages, Retrieved from the Internet: URL:http://www.3gpp.org/ftp/Meetings%5F3GPP%5FSYNC/RAN1/Docs/R1%2D1907074%2Ezip [retrieved on May 13, 2019] section 1-3.
International Search Report and Written Opinion—PCT/CN2019/101708—ISAEPO—May 20, 2020.
International Search Report and Written Opinion—PCT/CN2020/110511—ISA/EPO—Nov. 30, 2020.
NTT Docomo: "Feedback Design for CSI Type I", 3GPP TSG RAN WG1 Meeting #90, R1-1713915, Prague, Czechia, Aug. 21-25, 2017, Aug. 25, 2017 (Aug. 25, 2017) The Whole Document, pp. 1-6.
Huawei., et al., "Discussion on CSI Enhancement", 3GPP TSG RAN WG1 Meeting #98, R1-1908065, 3rd Generation Partnership Project (3GPP), Mobile Competence Centre, 650, Route Des Lucioles, F-06921, Sophia-Antipolis Cedex, France, vol. RAN WG1, No. Prague, Czech Republic, Aug. 26, 2019-Aug. 30, 2019, Aug. 17, 2019, 14 Pages, XP051764688, Section 5, p. 9-10.
Supplementary European Search Report—EP20855116—Search Authority—Munich—Jul. 26, 2023.
ZTE: "CSI Enhancement for MU-MIMO Support", 3GPP TSG RAN WG1 Meeting #95, R1-1813913, 3rd Generation Partnership Project, Mobile Competence Centre, 650 Route Des Lucioles, F-06921 Sophia-Antipolis Cedex, France, Spokane, USA, Nov. 12-16, 2018, 11 Pages, Nov. 13, 2018 (Nov. 13, 2018), XP051480110, p. 1-p. 9, Figures 1-4, the whole document.

* cited by examiner

FREQUENCY DOMAIN BASIS RESTRICTION FOR CSI REPORTING ENHANCEMENT

CROSS REFERENCE TO RELATED APPLICATION(S)

This application is a national phase entry of PCT Application No. PCT/CN2020/110511, entitled "FREQUENCY DOMAIN BASIS RESTRICTION FOR CSI REPORTING ENHANCEMENT" and filed on Aug. 21, 2020, which claims priority to International PCT Application No. PCT/CN2019/101708, entitled "FREQUENCY DOMAIN BASIS RESTRICTION FOR CSI REPORTING ENHANCEMENT" and filed on Aug. 21, 2019, both of which are expressly incorporated by reference herein in their entirety.

BACKGROUND

Technical Field

The present disclosure relates generally to communication systems, and more particularly, to a channel state information (CSI) reporting enhancement.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The UE may receive, from a base station, a frequency domain basis restriction indicating a frequency domain basis subset corresponding to a precoded port, the frequency domain basis subset being selected from a frequency domain basis set, receive, from the base station, a precoded channel state information (CSI) reference signal (CSI-RS) corresponding to the precoded port, select the precoded port from a set of precoded ports based on the CSI-RS; and transmit a precoding matrix indicator to the base station identifying the precoded port, the precoding matrix indicator being based on the frequency domain basis subset corresponding to the precoded port.

In some aspects, the UE may receive a plurality of frequency domain basis restrictions from the base station, each frequency domain basis restriction of the plurality of frequency domain basis restrictions may include a frequency domain basis subset, and a common frequency domain basis may be included in each frequency domain basis subset.

In some aspects, the frequency domain basis subset may be indicated by a bitmap or a table.

In some aspects, the UE may transmit a channel state information report based on the frequency domain basis subset to the base station.

In some aspects, the channel state information report may include the frequency domain basis subset based on the frequency domain basis restriction.

In some aspects, the channel state information report may not include the frequency domain basis subset based on the frequency domain basis restriction.

In some aspects, the precoding matrix indicator may include a frequency domain basis selection selected from the frequency domain basis subset.

In another aspect of the disclosure, a method, a computer-readable medium, and an apparatus are provided. The apparatus may be a base station. The base station may transmit, to a user equipment (UE) from, a frequency domain basis restriction indicating a frequency domain basis subset corresponding to a precoded port, the frequency domain basis subset being selected from a frequency domain basis set, transmit, to the UE, a precoded channel state information (CSI) reference signal (CSI-RS) corresponding to the precoded port, and receive, from the UE, a precoding matrix indicator identifying the precoded port, the precoding matrix indicator being based on the frequency domain basis subset corresponding to the precoded port.

In some aspects, the base station may transmit a plurality of frequency domain basis restrictions to the UE, each frequency domain basis restriction of the plurality of frequency domain basis restrictions may include a frequency domain basis subset, and a common frequency domain basis may be included in each frequency domain basis subset.

In some aspects, the frequency domain basis subset may be indicated by a bitmap or a table.

In some aspects, the base station may receive a channel state information report based on the frequency domain basis subset from the UE.

In some aspects, the channel state information report may include the frequency domain basis subset based on the frequency domain basis restriction.

In some aspects, the channel state information report may not include the frequency domain basis subset based on the frequency domain basis restriction.

In some aspects, the precoding matrix indicator may include a frequency domain basis selection selected from the frequency domain basis subset.

The frequency domain basis may be fed back in a CSI report from a user equipment (UE), with extra overhead and computation cost. There may exist some reciprocity between DL channels and UL channels. For example, there may be spatial/frequency domain coherence or correlation between the DL and UL channels. Thus, by leveraging reference signals (RS), e.g., sounding reference signals (SRS), the information of the frequency domain basis may be obtained by a base station, prior to the CSI report from the UE. Based on the information of the frequency domain basis, the base station may restrict the UE from reporting a certain subset of the frequency domain basis via a configuration, thereby reducing computation and feedback payload size of the UE.

In an aspect of the disclosure, a method, a computer-readable medium, and an apparatus are provided. The apparatus may be a UE configured to receive, from a base station, CSI reference signals (CSI-RS). The apparatus may be further configured to receive, from the base station, a configuration including a frequency domain basis restriction indicating a frequency domain basis subset, where the frequency domain basis subset is selected from a frequency domain basis set. The apparatus may be configured to prepare, upon receiving the frequency domain basis restriction, a CSI report based on the CSI-RS and the frequency domain basis subset. The apparatus may be further configured to transmit the CSI report to the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
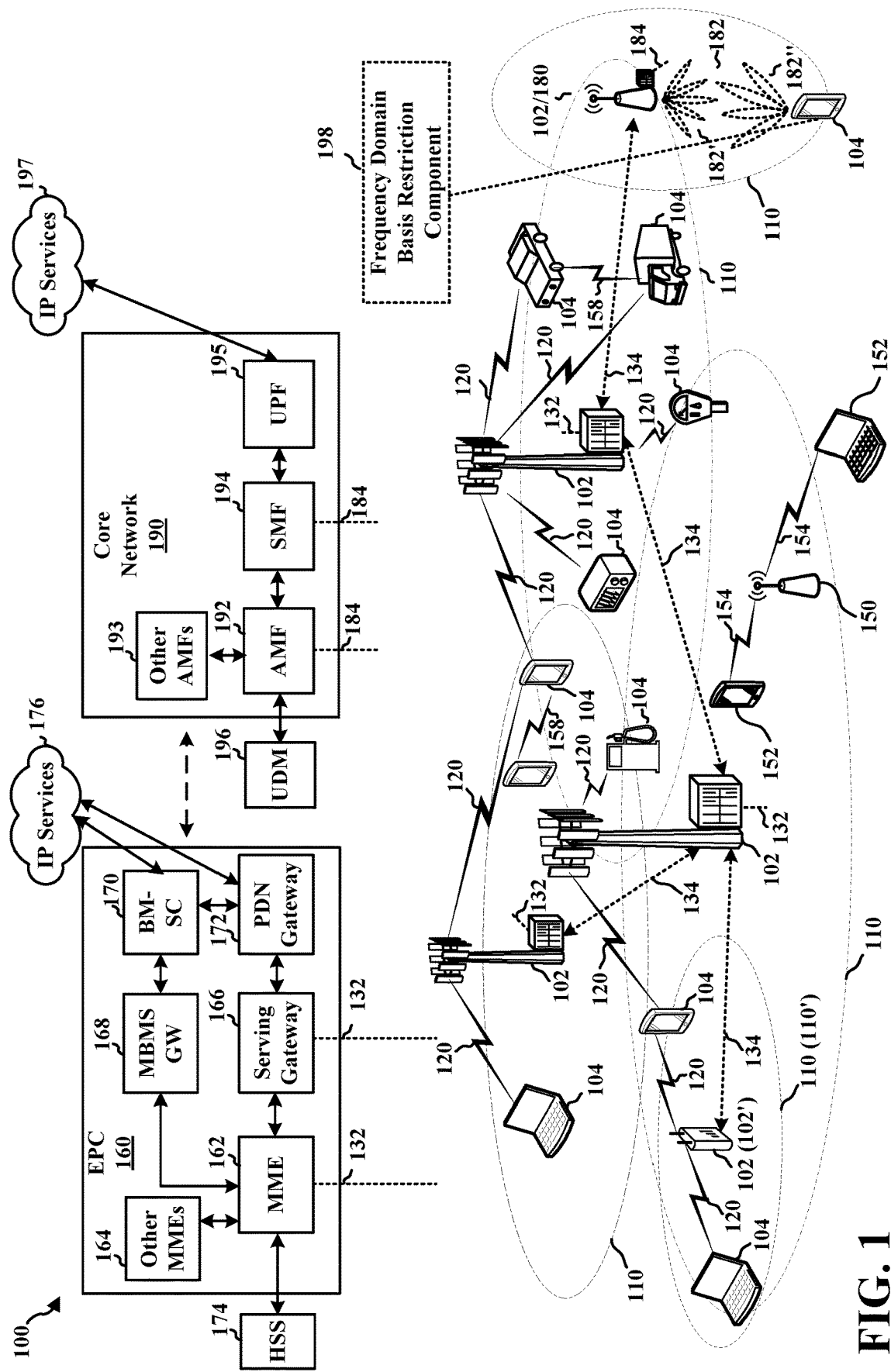
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to receive CSI-RS from the base station 102/180. The UE 104 may comprise a frequency domain basis restriction component 198 configured to receive, from the base station 102/180, a configuration including a frequency domain basis restriction indicating a frequency domain basis subset, where the frequency domain basis subset is selected from a frequency domain basis set. The UE 104 may be configured to prepare, upon receiving the frequency domain basis restriction, a CSI report based on the CSI-RS and the frequency domain basis subset. The UE 104 may be further configured to transmit the CSI report to the base station 102/180. Although the following description may be focused on 5G NR, the concepts described herein may be applicable to other similar areas, such as LTE, LTE-A, CDMA, GSM, and other wireless technologies.

Figure 2B:
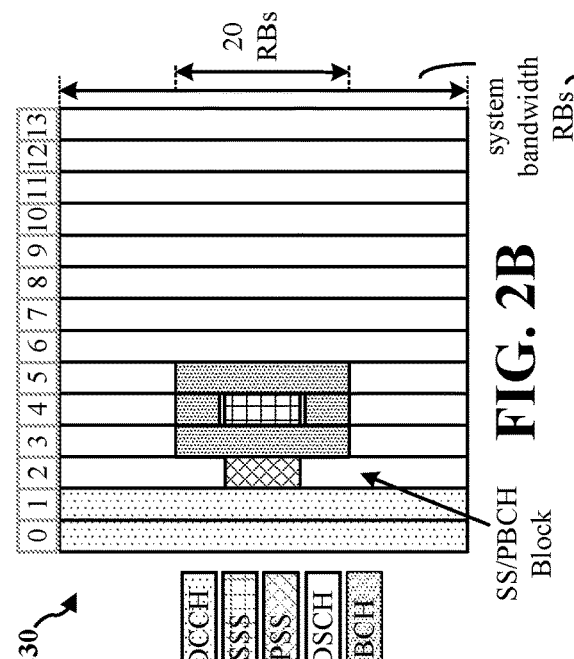
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.
Figure 2D:
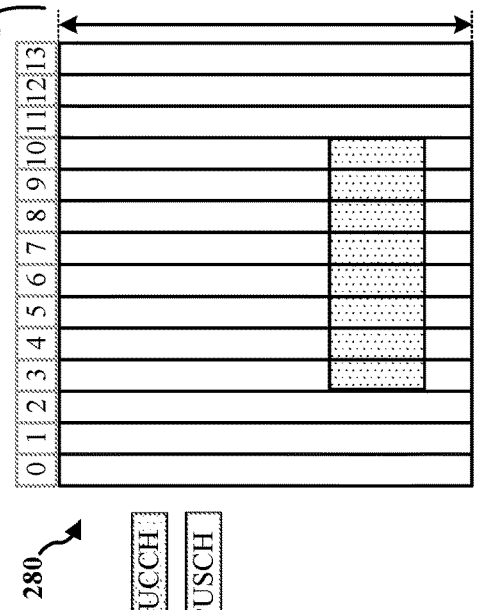
Figure 2A:
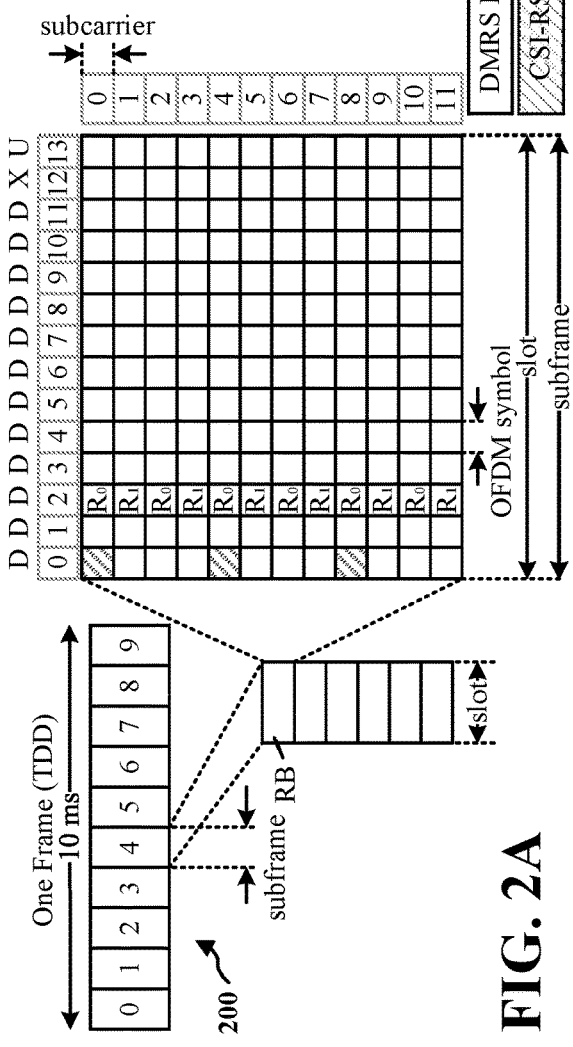
Figure 2C:
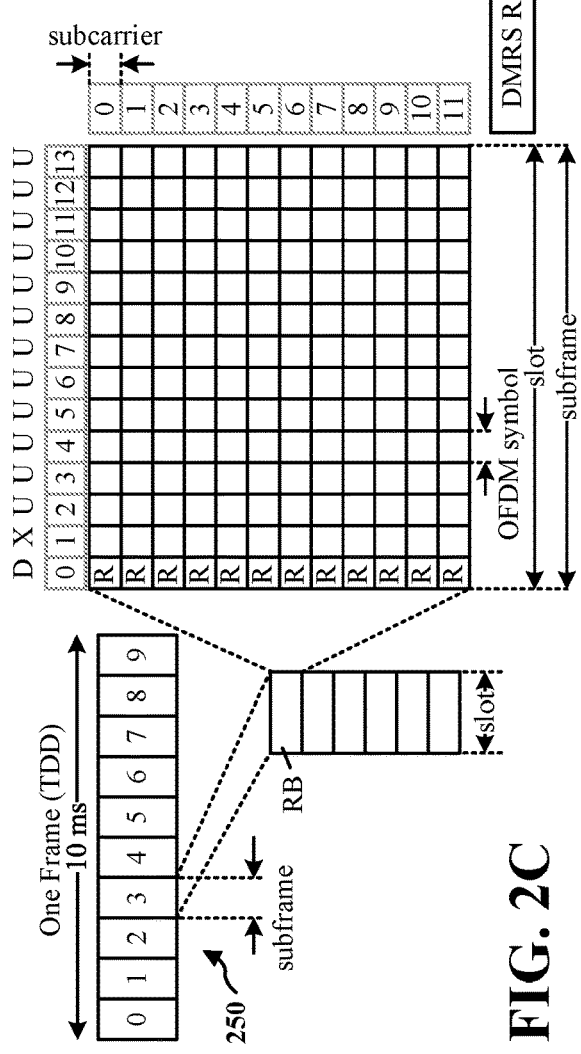

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
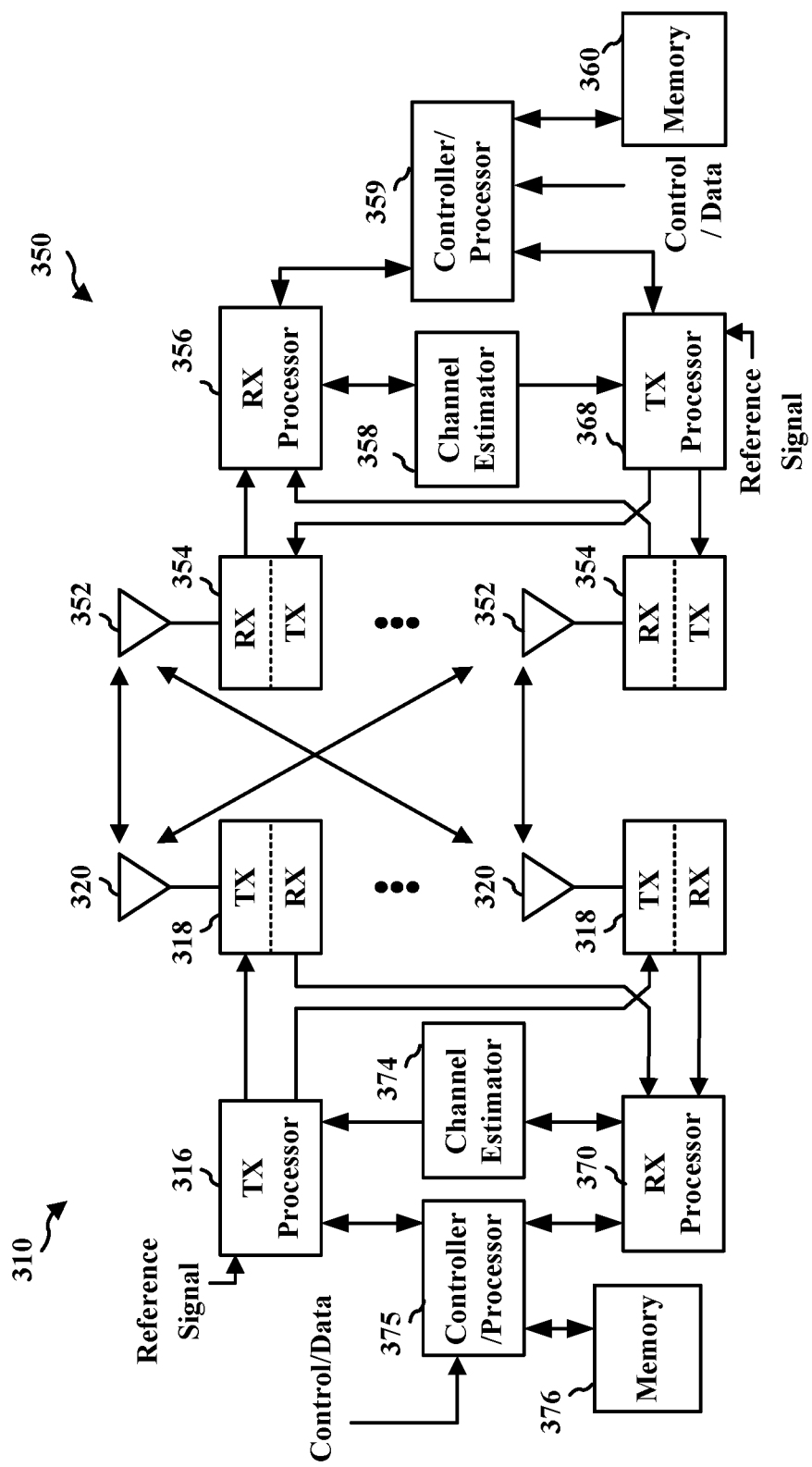
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations. At least one of the TX processor 368, the RX processor 356, and the controller/processor 359 may be configured to perform aspects in connection with 198 of FIG. 1.

Figure 4:
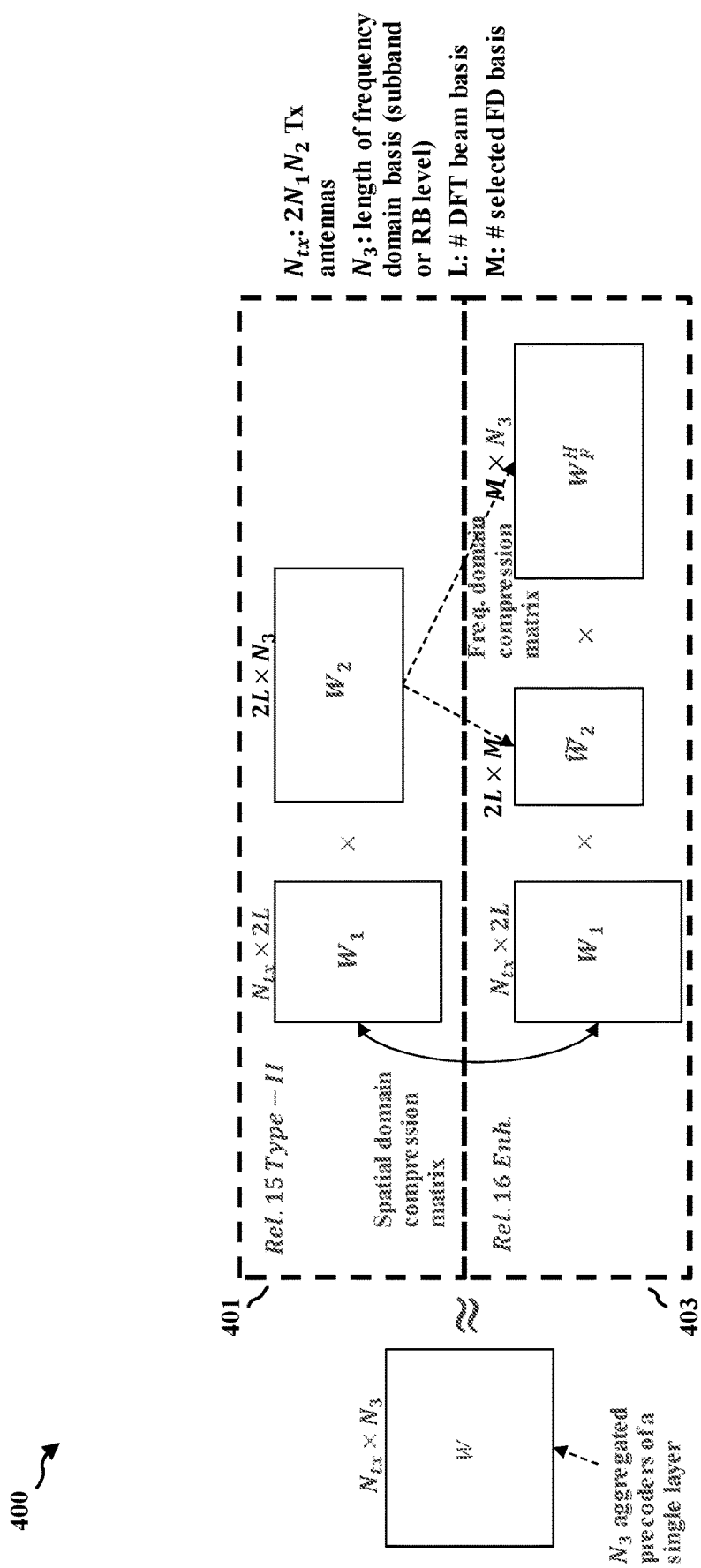
FIG. 4 is a diagram illustrating examples of different configurations for spatial and frequency domain compression based CSI reporting.

FIG. 4 is a diagram 400 illustrating examples of different configurations for spatial and frequency domain compression based CSI reporting. In a first configuration 401, linear combinations of DFT beams may be used to capture spatial domain sparsity. In this configuration, relevant coefficients may be reported per beam per subband. Thus, there may be a large overhead because of a large number of subbands or beams.

In a second configuration 403, both spatial and frequency domain sparsity may be captured. The relevant coefficients may be reported per beam per frequency domain basis. Thus, the overhead may be reduced with much less report coefficients.

As illustrated in FIG. 4, $N_3$ refers to a configured length/size of a frequency domain basis set (subbands or RB level). A length/size of a frequency domain basis set refers to a number of elements of the frequency domain basis set. The system may have $N_3$ subbands and 2L SD beams. The frequency domain compression matrix $W_F^H$ may have a length/size of $N_3 \times M$, where $M < N_3$ is the number of frequency domain (FD) basis vectors that are selected after compression. M refers to a selected/configured frequency domain basis for a layer.

The frequency domain basis may be reported in a CSI report from the UE, with extra overhead and computation cost. For example, for $N_3$ total number of frequency domain basis, the overhead per layer for frequency domain basis indication may be $\lceil \log_2 C_{N_3-1}^{M-1} \rceil$, where M is the configured frequency domain basis for this layer.

There may exist some reciprocity between DL channels and UL channels. For example, there may be spatial/frequency domain coherence or correlation between the DL and UL channels. Thus, by leveraging RS, e.g., SRS, the information of the frequency domain basis may be obtained by the base station, prior to the CSI report from the UE. As an example, from the reciprocity between the DL channels and UL channels, the characteristic of the frequency domain basis or the strongest power associated with the frequency domain basis may be extracted based on the SRS. The base station may also use other RS from the UE, or a previously transmitted CSI report, to obtain information of the frequency domain basis.

Based on the information of the frequency domain basis, the base station may restrict the UE from reporting a certain subset of the frequency domain basis via a configuration, to reduce UE computation and feedback payload size. The base station 502 may control the UE 504 to report only certain subsets of the frequency domain basis, thereby reducing UE computation and feedback payload. In this way, data rates, capacity, and spectral efficiency of the communication may be improved.

Figure 5:
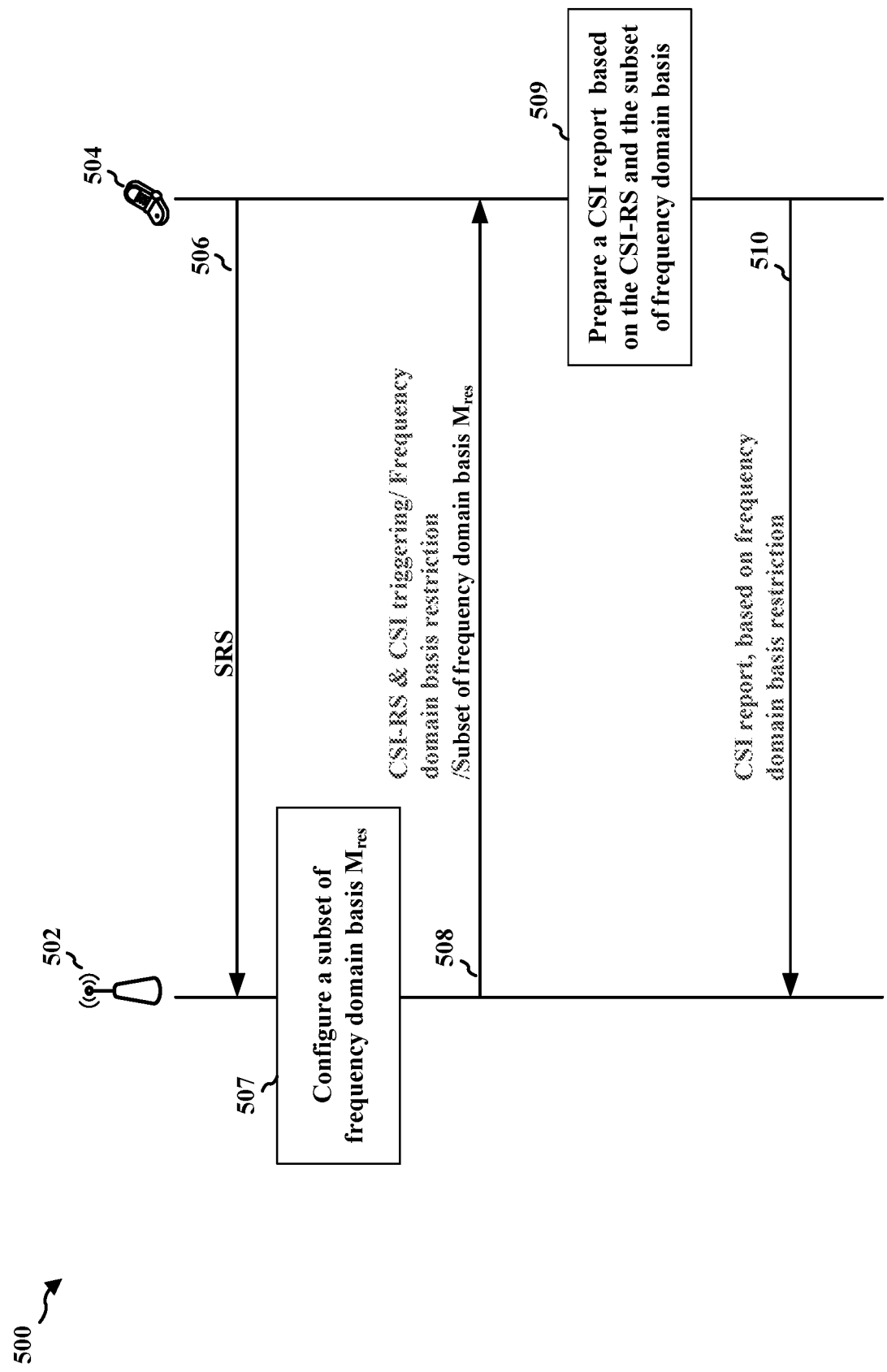
FIG. 5 is a flow chart illustrating frequency domain basis restriction for CSI reporting enhancement.

FIG. 5 is a flow chart 500 illustrating frequency domain basis restriction for CSI reporting enhancement. A UE 504 may transmit SRS 506 to a base station 502, for the base station 502 to obtain information of the frequency domain basis. The base station 502 may monitor the frequency domain behavior of the UE 504 via the SRS 506. The UE 504 may also transmit other RS to the base station 502. The UE 504 may also transmit a previously transmitted CSI report to the base station 502 for the base station 502 to extract information of the frequency domain basis.

The base station 502 may transmit CSI-RS. For requesting aperiodic or semi-persistent CSI reports, the base station 502 may also transmit a CSI triggering to trigger the UE 504 to generate a CSI report. The base station 502 may transmit a configuration including a frequency domain basis restriction indicating a subset of frequency domain basis $M_{res}$ 508 to the UE 504. The UE 504 may receive the CSI-RS. For the aperiodic or semi-persistent CSI reports, the UE 504 may also receive the CSI triggering. The UE 504 may receive the configuration with the frequency domain basis restriction indicating the subset of frequency domain basis $M_{res}$ 508 from the base station 502.

In some aspects, for a frequency domain basis set (e.g., super set) with a total number of $N_3-1$ frequency domain basis vectors, the base station 502 may configure the subset of frequency domain basis $M_{res}$ 508, as illustrated at 507. The subset of frequency domain basis $M_{res}$ 508 is within the frequency domain basis set (e.g., super set) with the total number of $N_3-1$ frequency domain basis vectors. For example, $N_3$ may be 8, thus, $N_3-1$ may be 7. The base station 502 may configure the subset of frequency domain basis $M_{res}$ 508 within the frequency domain basis set with the 7 frequency domain basis vectors.

In some aspects, $M_{res}$ 508 may be associated with the configuration of $N_3$ and M. For example, $M_{res}$ 508 may satisfy $M<\text{length}(M_{res})<N_3$ where $\text{length}(M_{res})$ refers to a number of elements of the subset of frequency domain basis $M_{res}$ 508.

In some aspects, the subset of frequency domain basis $M_{res}$ 508 may be signaled via a bit-map, or an index, or a combination index. For example, if 2 elements out of 4 total elements may be selected, then a number of possible combinations of 2 elements from 4 elements may be $C_4^2=6$ (1&2, 1&3, 1&4, 2&3, 2&4, 3&4). Thus, at most 3-bit may be needed to report a selected combination. If a combination index may be "001", then the combination index "001" may correspond to a selected combination "1&3" in the index of the selected elements. The signaling may be hierarchical, e.g., a higher layer may signal a superset of the frequency domain basis and a lower layer may indicate a selection of the superset of the frequency domain basis. For example, $M_{res}$ 508 may be configured with a set of the frequency domain basis {{1,2,3}, {3,7,8}} via a medium access control-control element (MAC-CE) configuration, and a subset of the subset of frequency domain basis $M_{res}$ 508, e.g., {1, 2, 3} may be selected in downlink control information (DCI).

In some aspects, the subset of frequency domain basis $M_{res}$ 508 may be commonly or differently configured for different ranks, or layers. For example, for rank<=2, $M_{res}$={11, 2, 3}; for rank>2, $M_{res}$={1, 2, 3}, for layer 1 and layer 2, and $M_{res}$={1, 3, 8}, for layer 3 and layer 4.

In some aspects, the subset of frequency domain basis $M_{res}$ 508 may be commonly or differently configured for different spatial domain basis (e.g., DFT beams). For example, if there are a first spatial domain basis and a second spatial domain basis, for the first spatial domain basis, $M_{res}$=11, 2, 31; for the second spatial domain basis, $M_{res}$={1, 3, 8}. The configuration of the subset of frequency domain basis $M_{res}$ 508 may be a base station implementation.

The base station 502 may send the subset of frequency domain basis $M_{res}$ 508 to the UE 504, where the subset of frequency domain basis $M_{res}$ 508 may be selected from the frequency domain basis set with a total number of $N_3-1$ frequency domain basis vectors. The UE 504 may receive the subset of frequency domain basis $M_{res}$ 508 from the base station 502, prior to sending a CSI report 510 to the base station 502.

The UE 504 may prepare, upon receiving the frequency domain basis restriction, the CSI report 510 based on the CSI-RS and the subset of frequency domain basis $M_{res}$ 508, as illustrated at 509.

For example, if $\text{length}(M_{res})=M$, then the subset of frequency domain basis $M_{res}$ 508 may not be reported by UE 504. When the length of the subset of frequency domain basis $M_{res}$ 508 is the same as the configured/selected frequency domain basis M, the subset of frequency domain basis $M_{res}$ 508 may not be reported by the UE 504. The CSI report 510 may not include the subset of frequency domain basis $M_{res}$ 508, based on the frequency domain basis restriction.

For another example, if $\text{length}(M_{res})>M$, the reported coefficient may be modified to be further selected within the subset of frequency domain basis $M_{res}$ 508. Thus, $\lceil \log_2 C_{M_{res}-1}^{M-1} \rceil$ payload may be needed to report the selected frequency domain basis per layer. In some aspects, the CSI report 510 may include a frequency domain basis selection that is selected from the subset of frequency domain basis $M_{res}$ 508, based on the frequency domain basis restriction.

For yet another example, if the subset of frequency domain basis $M_{res}$ 508 is differently configured for different spatial domain basis, then only spatial domain basis selection may be reported, and no further coefficients indication may be reported. For example, referring back to FIG. 4, in the $\tilde{W}_2$ matrix with a size of 2L×M, for reporting values (e.g., k values) within the $\tilde{W}_2$ matrix, a coefficient indication may be needed to indicate the selection of frequency domain basis. Because the subset of frequency domain basis $M_{res}$ 508 is differently configured for different spatial domain basis and the subset of frequency domain basis $M_{res}$ 508 is selected from the frequency domain basis set, there is no need to select from the frequency domain basis set. Thus, no further coefficients indication may be needed in the CSI report 510. The CSI report 510 may not include a coefficient indication.

The UE 504 may send the CSI report 510, based on the frequency domain restriction, to the base station 502.

Figure 6:
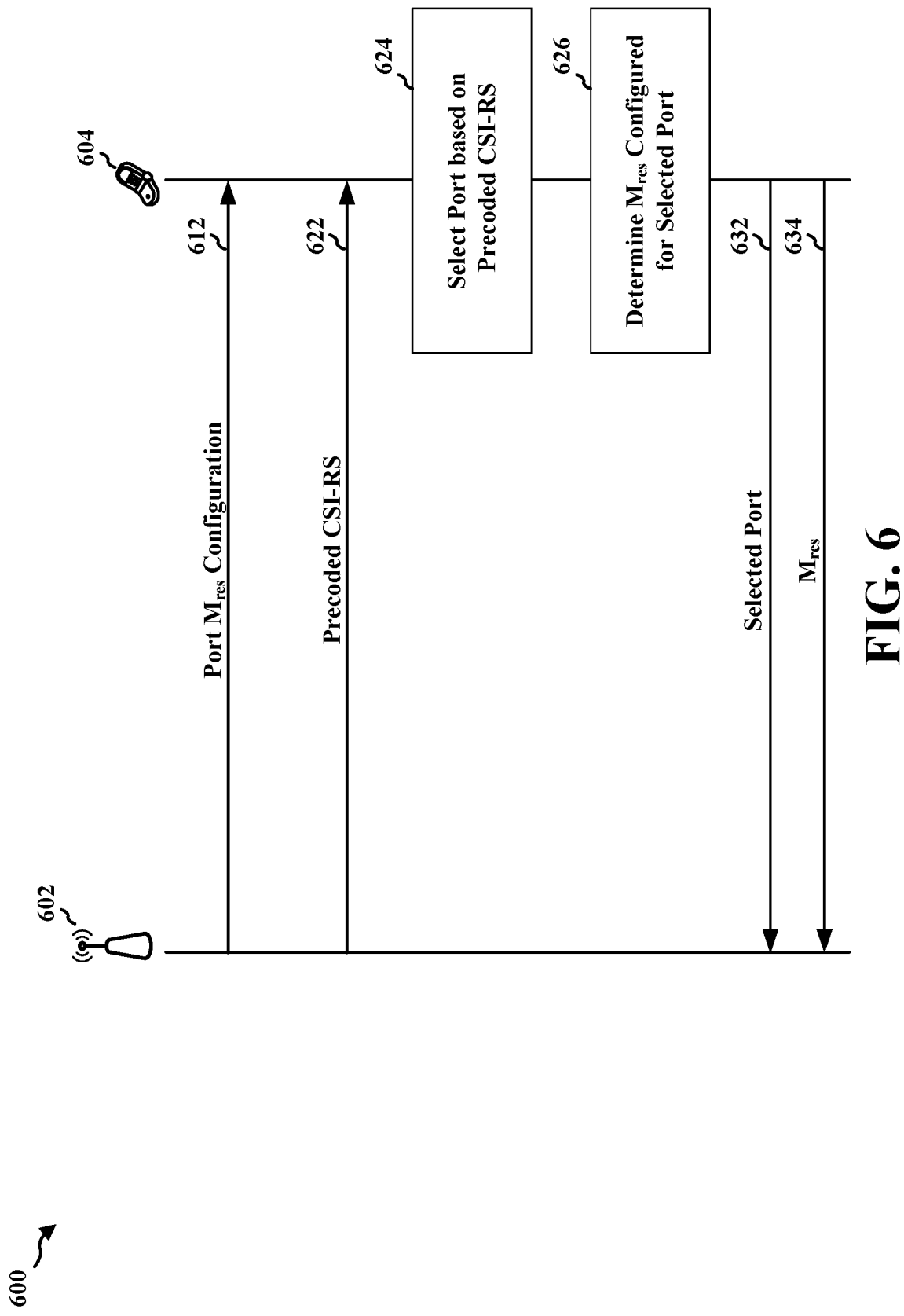
FIG. 6 is a communication flow diagram illustrating frequency domain basis restriction with a port selection codebook.

FIG. 6 is a communication flow diagram 600 illustrating frequency domain basis restriction with a port selection codebook. A base station 602 and a UE 604 may communicate using a port selection codebook, for example, where the UE 604 provides feedback to the base station 602 regarding which port to use, and where the base station 602 applies a precoding vector for a selected port to transmissions to the UE 604.

The base station 602 may transmit a port $M_{res}$ configuration 612 to the UE 604, and the UE 604 may receive the port $M_{res}$ configuration 612. The port $M_{res}$ configuration 612 may indicate an $M_{res}$ including a frequency domain basis subset corresponding to a precoded port. In some aspects, the port $M_{res}$ configuration 612 may indicate an $M_{res}$ for multiple precoded ports or for each precoded port. For example, the port $M_{res}$ configuration 612 may include a table or a bitmap with rows corresponding to precoded ports and columns corresponding to frequency domain basis, and the entries in the table or bitmap may indicate which frequency domain basis are in the frequency domain basis subset for the precoded port corresponding to that row. In some aspects, one common frequency domain basis may be included in the frequency domain basis subset for every precoded port. For example, the port 1 $M_{res}$ may include frequency domain basis 1 and 3, the port 2 $M_{res}$ may include frequency domain basis 1 and 4, the port 3 $M_{res}$ may include frequency domain basis 1 and 2, and the port 4 $M_{res}$ may include frequency domain basis 1 and 2 (e.g., frequency domain basis 1 may be common to the frequency domain basis subset for ports 1, 2, 3, and 4). In some aspects, the base station 602 may precode a CSI-RS port with a phase rotation (e.g., DFT vector rotation to the frequency domain channel). The received CSI-RS may be rotated to the frequency domain channel frequency.

The base station 602 may transmit a plurality of precoded CSI-RS 622. The precoded CSI-RS may be precoded based on the precoding vectors for different precoded ports. The UE 604 may receive the precoded CSI-RS. As illustrated at 624, the UE 604 may select a port based on the precoded CSI-RS 622. For example, the UE 604 may select the port corresponding to a CSI-RS with a highest received power or channel quality.

As illustrated at 626, the UE 604 may determine the $M_{res}$ configured for the port selected at 624. The UE 604 may determine the $M_{res}$ for the selected based on the received port $M_{res}$ configuration 612, by determining the $M_{res}$ indicated as corresponding to the selected port. Multiple $M_{res}$ may correspond to the selected port (e.g., the port $M_{res}$ configuration 612 may include multiple $M_{res}$ for the selected port). The UE 604 may determine an $M_{res}$ at 626 by selecting an $M_{res}$ from the multiple $M_{res}$ corresponding to the selected port.

The UE 604 may transmit the selected port 632 selected at 624 to the base station 602, and may transmit the $M_{res}$ 634 determined at 626 to the base station 602. The base station 602 may receive the selected port 632 and the $M_{res}$ 634. In some aspects, the UE 604 may transmit a PMI including the selected port 632 and the $M_{res}$ 634 to the base station 602. The PMI may be based on the $M_{res}$ of the selected port. For example, the information in the PMI may be restricted based on the $M_{res}$ corresponding to the selected port determined at 626. In some aspects, thehe UE 602 may use the determined $M_{res}$ 634 in CSI reporting, as described above with respect to FIG. 5, including 509 and 510 of FIG. 5.

Figure 7:
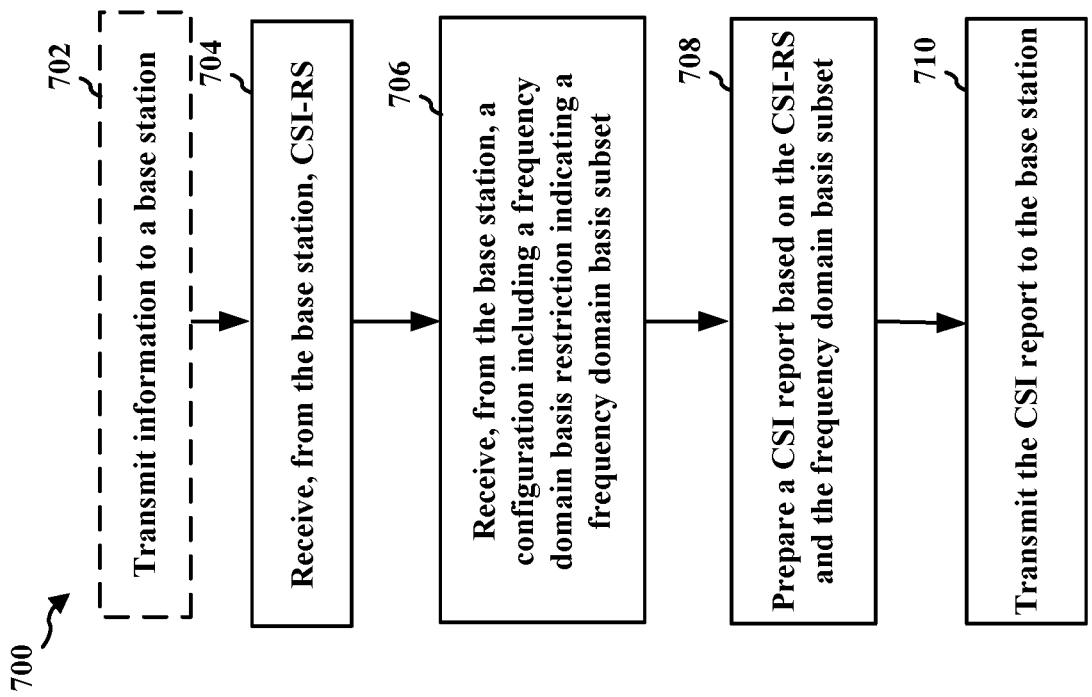
FIG. 7 is a flowchart of a method of wireless communication.

FIG. 7 is a flowchart 700 of a method of wireless communication. The method may be performed by a UE (e.g., the UE 104, 504; the apparatus 802/802'; the processing system 914, which may include the memory 360 and which may be the entire apparatus UE or a component of the apparatus, such as the TX processor 368, the RX processor 356, and/or the controller/processor 359). To facilitate an understanding of the techniques and concepts described herein, the method of flowchart 700 may be discussed with reference to the examples illustrated in FIGS. 4-5. Optional aspects may be illustrated in dashed lines. Aspects presented herein provide a method for frequency domain basis restriction for CSI reporting enhancement. In this way, data rates, capacity, and spectral efficiency of the communication may be improved.

At 702, the UE may transmit information to a base station indicating a frequency domain basis subset, where a frequency domain basis restriction may be based on the transmitted information. For example, 702 may be performed by a transmission component 806 from FIG. 8. In some aspects, the transmitted information may comprise RS (e.g., SRS), and the frequency domain basis restriction may be based on the transmitted RS (e.g., SRS). In some aspects, the transmitted information may comprise a previously transmitted CSI report, and the frequency domain basis restriction may be based on the previously transmitted CSI report. For example, referring back to FIG. 5, a UE 504 may transmit SRS 506 to a base station 502, for the base station 502 to obtain information of the frequency domain basis. The base station 502 may monitor the frequency domain behavior of the UE 504 via the SRS 506. The UE 504 may also transmit other RS to the base station 502. The UE 504 may also transmit a previously transmitted CSI report to the base station 502 for the base station 502 to extract information of the frequency domain basis.

At 704, the UE may receive CSI-RS from the base station. For example, 704 may be performed by a CSI-RS component 808 from FIG. 8. For example, referring back to FIG. 5, the base station 502 may transmit CSI-RS. For requesting aperiodic CSI reports, the base station 502 may also transmit a CSI triggering to trigger the UE 504 to generate a CSI report. The UE 504 may receive the CSI-RS. For aperiodic CSI, the UE 504 may also receive the CSI triggering.

At 706, the UE may receive, from the base station, a configuration including a frequency domain basis restriction indicating a frequency domain basis subset, where the frequency domain basis subset is selected from a frequency domain basis set. For example, 706 may be performed by a frequency domain basis restriction component 810 from FIG. 8. For example, referring back to FIG. 5, the base station 502 may transmit a configuration including a frequency domain basis restriction indicating a subset of frequency domain basis $M_{res}$ 508 to the UE 504. The UE 504 may receive the frequency domain basis restriction indicating the subset of frequency domain basis $M_{res}$ 508 from the base station 502. For example, the UE 504 may receive the configuration including the frequency domain basis restriction indicating the subset of frequency domain basis $M_{res}$ 508. In some aspects, for a frequency domain basis set (e.g., superset) with a total number of $N_3-1$ frequency domain basis vectors, the base station 502 may configure the subset of frequency domain basis $M_{res}$ 508, as illustrated at 507. The subset of frequency domain basis $M_{res}$ 508 is within the frequency domain basis set (e.g., superset) with the total number of $N_3-1$ frequency domain basis vectors. For example, $N_3$ may be 8, thus, $N_3-1$ may be 7. The base station 502 may configure the subset of frequency domain basis $M_{res}$ 508 within the frequency domain basis set with the 7 frequency domain basis.

In some aspects, the frequency domain basis subset may be indicated by a bitmap or an index. In some aspects, the frequency domain basis subset may be indicated by a combination index. For example, referring back to FIG. 5, the subset of frequency domain basis $M_{res}$ 508 may be signaled via a bit-map, or an index, or a combination index. For example, if 2 elements out of 4 total elements may be selected, then a number of possible combinations of 2 elements from 4 elements may be $C_4^2=6$ (1&2, 1&3, 1&4, 2&3, 2&4, 3&4). Thus, at most 3-bit may be needed to report a selected combination. If a combination index may be "001", then the combination index "001" may correspond to a selected combination "1&3" in the index of the selected elements. The signaling may be hierarchical, e.g., a higher layer may signal a superset of the frequency domain basis and a lower layer may indicate a selection of the superset of the frequency domain basis. For example, $M_{res}$ 508 may be configured with a set of the frequency domain basis {{1,2, 3}, {3,7,8}} via an MAC-CE configuration, and a subset of the subset of frequency domain basis $M_{res}$ 508, e.g., {1, 2, 3} may be selected in DCI.

In some aspects, the frequency domain basis subset may be commonly configured for at least one of different ranks or different layers. In some aspects, the frequency domain basis subset may be differently configured for at least one of different ranks or different layers. For example, referring back to FIG. 5, the subset of frequency domain basis $M_{res}$ 508 may be commonly or differently configured for different ranks, or layers. For example, for rank<=2, $M_{res}$={1, 2, 3}; for rank>2, $M_{res}$={1, 2, 3}, for layer 1 and layer 2, and $M_{res}$={1, 3, 8}, for layer 3 and layer 4.

In some aspects, the frequency domain basis subset may be commonly configured for different spatial domain basis. In some aspects, the frequency domain basis subset may be differently configured for different spatial domain basis. For example, referring back to FIG. 5, if there are a first spatial domain basis and a second spatial domain basis, for the first spatial domain basis, $M_{res}$={1, 2, 3}; for the second spatial domain basis, $M_{res}$={1, 3, 8}. The configuration of the subset of frequency domain basis $M_{res}$ 508 may be a base station implementation.

At 708, the UE may prepare, upon receiving the frequency domain basis restriction, a CSI report based on the CSI-RS and the frequency domain basis subset. For example, 708 may be performed by a CSI report component 812 from FIG. 8. For example, referring back to FIG. 5, the UE 504 may prepare, upon receiving the frequency domain basis restriction, the CSI report 510 based on the CSI-RS and the subset of frequency domain basis $M_{res}$ 508, as illustrated at 509.

In some aspects, the CSI report may include the frequency domain basis subset based on the frequency domain basis restriction. For example, referring back to FIG. 5, $M_{res}$ 508 may be associated with the configuration of $N_3$ and M. For example, $M_{res}$ 508 may satisfy M<length($M_{res}$)<$N_3$, where length($M_{res}$) refers to a number of elements with the subset of frequency domain basis $M_{res}$ 508.

In some aspects, the CSI report may not include the frequency domain basis subset based on the frequency domain basis restriction. For example, referring back to FIG. 5, if length($M_{res}$)=M, then the subset of frequency domain basis $M_{res}$ 508 may not be reported by UE 504. When the length of the subset of frequency domain basis $M_{res}$ 508 is the same as the configured/selected frequency domain basis M, the subset of frequency domain basis $M_{res}$ 508 may not be reported by the UE 504. The CSI report 510 may not include the subset of frequency domain basis $M_{res}$ 508, based on the frequency domain basis restriction.

In some aspects, wherein the CSI report may include a frequency domain basis selection selected from the configured frequency domain basis subset. For example, referring back to FIG. 5, if length($M_{res}$)>M, the reported coefficient may be modified to be further selected within the subset of frequency domain basis $M_{res}$ 508. Thus, $\lceil \log_2 C_{M_{res}-1}^{M-1} \rceil$ payload may be needed to report the selected frequency domain basis per layer. In some aspects, the CSI report 510 may include a frequency domain basis selection that is selected from the subset of frequency domain basis $M_{res}$ 508, based on the frequency domain basis restriction.

In some aspects, wherein the CSI report does not include a coefficient indication. For example, referring back to FIG. 5, if the subset of frequency domain basis $M_{res}$ 508 is differently configured for different spatial domain basis, then only spatial domain basis selection may be reported, and no further coefficients indication may be reported. For example, referring back to FIG. 4, in the $\tilde{W}_2$ matrix with a size of 2L×M, for reporting values (e.g., k values) within the $\tilde{W}_2$ matrix, a coefficient indication may be needed to indicate the selection of frequency domain basis. Because the subset of frequency domain basis $M_{res}$ 508 is differently configured for different spatial domain basis and the subset of frequency domain basis $M_{res}$ 508 selected from the frequency domain basis set, there is no need to select from the frequency domain basis set. Thus, no further coefficients indication may be needed in the CSI report 510. The CSI report 510 may not include a coefficient indication.

At 710, the UE may transmit the CSI report to the base station. For example, 710 may be performed by the transmission component 806 from FIG. 8. For example, referring back to FIG. 5, the UE 504 may send the CSI report 510, based on the frequency domain restriction, to the base station 502.

Figure 8:
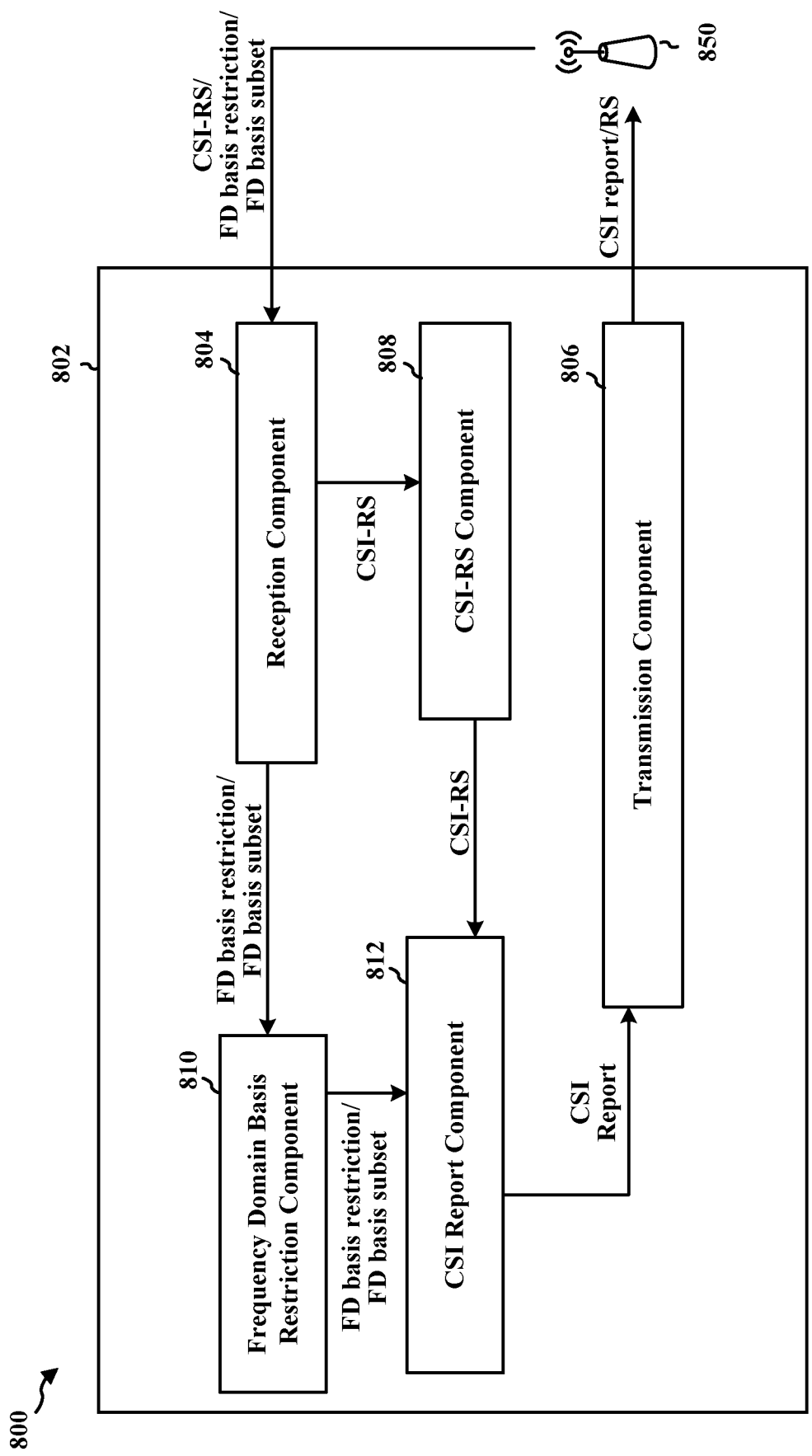
FIG. 8 is a conceptual data flow diagram illustrating the data flow between different means/components in an example apparatus.

FIG. 8 is a conceptual data flow diagram 800 illustrating the data flow between different means/components in an example apparatus 802. The apparatus may be a UE (e.g., the UE 104, 504; the apparatus 802/802'; the processing system 814, which may include the memory 360 and which may be the entire apparatus UE or a component of the apparatus, such as the TX processor 368, the RX processor 356, and/or the controller/processor 359). The apparatus includes a reception component 804 that receives from a base station, e.g., as described in connection with 704, 706 in FIG. 7. The apparatus includes a transmission component 806 that transmits a CSI report/RS to the base station, e.g., as described in connection with 702, 710 in FIG. 7. The apparatus includes a CSI-RS Component 808 that receives, via the reception component 804, CSI-RS, e.g., as described in connection with 704 in FIG. 7. The apparatus includes a frequency domain basis restriction component 810 that receives, via the reception component 804, a configuration including a frequency domain basis restriction indicating a frequency domain basis subset, e.g., as described in connection with 706 in FIG. 7. The apparatus includes a CSI report component 812 that prepares a CSI report based on the CSI-RS and the frequency domain basis subset, e.g., as described in connection with 708 in FIG. 7.

The apparatus may include additional components that perform each of the blocks of the algorithm in the aforementioned flowcharts of FIGS. 4-7. As such, each block in the aforementioned flowcharts of FIGS. 4-7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
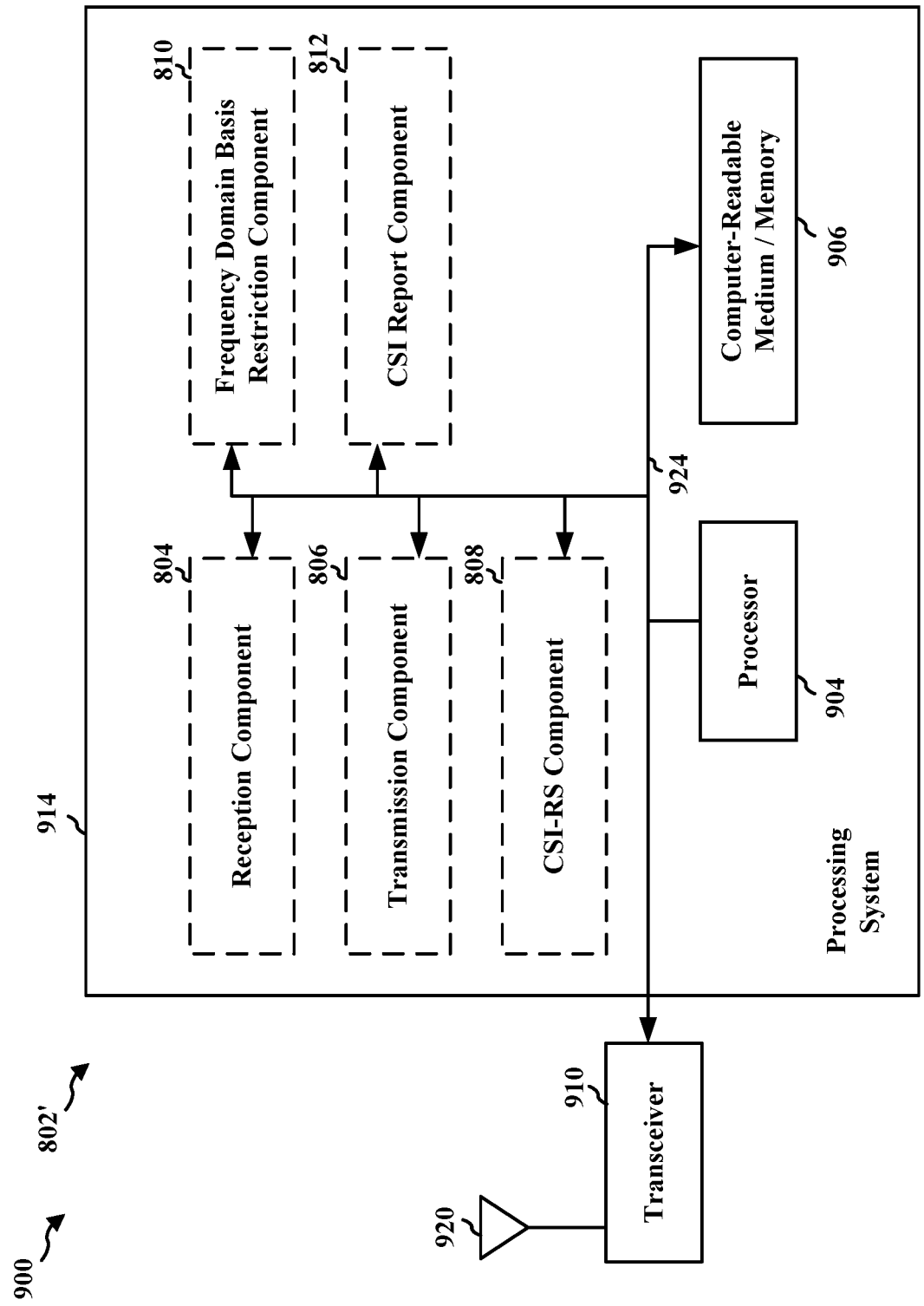
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 806, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359. Alternatively, the processing system 914 may be the entire UE (e.g., see 350 of FIG. 3).

In one configuration, the apparatus 802/802' for wireless communication includes means for receiving, from a base station, CSI-RS. The apparatus further includes means for receiving, from the base station, a configuration including a frequency domain basis restriction indicating a frequency domain basis subset, where the frequency domain basis subset is selected from a frequency domain basis set. The apparatus further includes means for preparing, upon receiving the frequency domain basis restriction, a CSI report based on the CSI-RS and the frequency domain basis subset. The apparatus further includes means for transmitting the CSI report to the base station. In one configuration, the apparatus further includes means for transmitting information to the base station indicating the frequency domain basis subset, where the frequency domain basis restriction is based on the transmitted information. The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
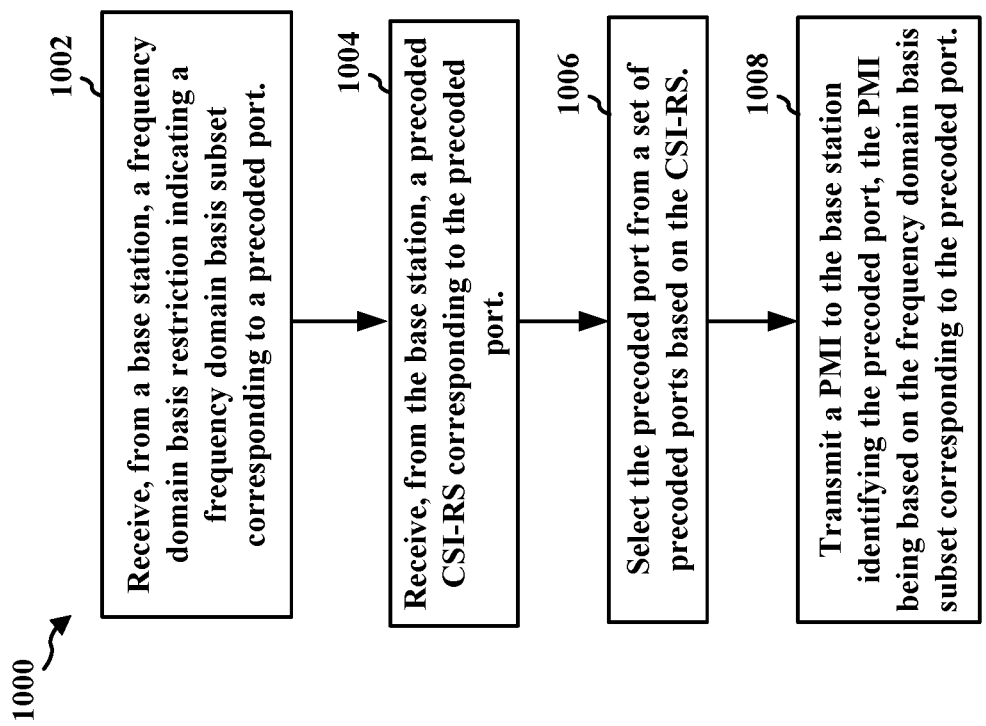
FIG. 10 is a flowchart of a method of wireless communication.

FIG. 10 is a flowchart 1000 of a method of wireless communication. The method may be performed by a UE (e.g., the UE 104, 604; the apparatus 1202).

At 1002, the UE may receive, from a base station, a frequency domain basis restriction indicating a frequency domain basis subset corresponding to a precoded port, the frequency domain basis subset being selected from a frequency domain basis set. For example, 1002 may be performed by the $M_{res}$ reception component 1240 of FIG. 12.

At 1004, the UE may receive, from the base station, a precoded channel state information (CSI) reference signal (CSI-RS) corresponding to the precoded port. For example, 1004 may be performed by the precoded CSI-RS reception component 1242 of FIG. 12. The UE may receive a plurality of frequency domain basis restrictions from the base station. Each frequency domain basis restriction of the plurality of frequency domain basis restrictions may include a frequency domain basis subset, and a common frequency domain basis may be included in each frequency domain basis subset. The frequency domain basis subset may be indicated by a bitmap or a table.

At 1006, the UE may select the precoded port from a set of precoded ports based on the CSI-RS. For example, 1006 may be performed by the port selection component 1244 of FIG. 12.

At 1008, the UE may transmit a precoding matrix indicator to the base station identifying the precoded port, the precoding matrix indicator being based on the frequency domain basis subset corresponding to the precoded port. For example, 1008 may be performed by the PMI transmission component 1246 of FIG. 12. In some aspects, the precoding matrix indicator may include the frequency domain basis subset based on the frequency domain basis restriction. In some aspects, the precoding matrix indicator may not include the frequency domain basis subset based on the frequency domain basis restriction. The precoding matrix indicator may include a frequency domain basis selection selected from the frequency domain basis subset.

In some aspects, the UE may transmit a channel state information report based on the frequency domain basis subset to the base station In some aspects, the channel state information report may include the frequency domain basis subset based on the frequency domain basis restriction. In some aspects, the channel state information report may not include the frequency domain basis subset based on the frequency domain basis restriction.

Figure 11:
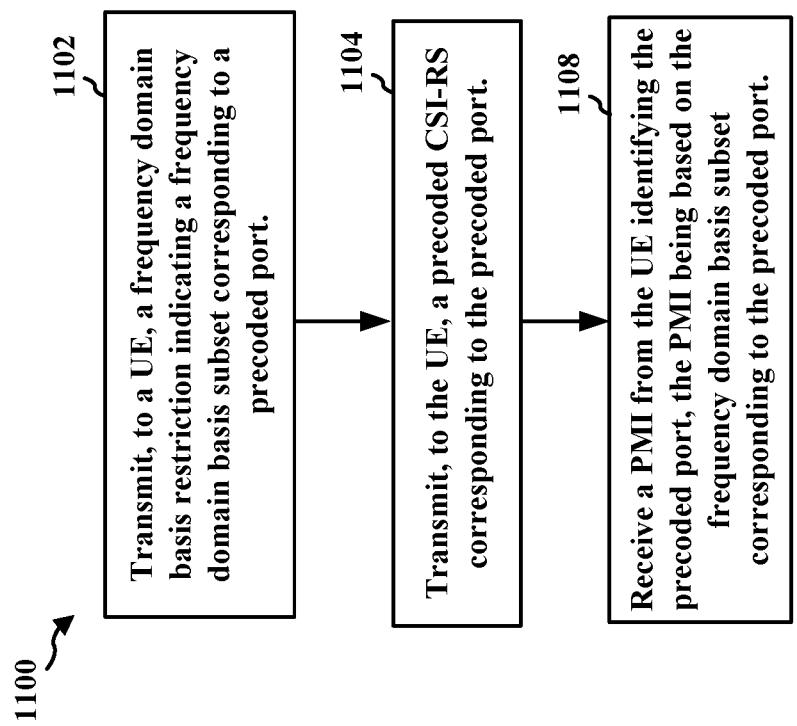
FIG. 11 is a flowchart of a method of wireless communication.

FIG. 11 is a flowchart 1100 of a method of wireless communication. The method may be performed by a base station (e.g., the base station 102/180, 602; the apparatus 1302).

At 1102, the base station may transmit, to a UE from, a frequency domain basis restriction indicating a frequency domain basis subset corresponding to a precoded port, the frequency domain basis subset being selected from a frequency domain basis set. For example, 1102 may be performed by the $M_{res}$ transmission component 1340 of FIG. 13. The base station may transmit a plurality of frequency domain basis restrictions to the UE. Each frequency domain basis restriction of the plurality of frequency domain basis restrictions may include a frequency domain basis subset, and a common frequency domain basis may be included in each frequency domain basis subset. The frequency domain basis subset may be indicated by a bitmap or a table.

At 1104, the base station may transmit, to the UE, a precoded channel state information (CSI) reference signal (CSI-RS) corresponding to the precoded port. For example, 1104 may be performed by the precoded CSI-RS transmission component 1342 of FIG. 13.

At 1106, the base station may receive, from the UE, a precoding matrix indicator identifying the precoded port, the precoding matrix indicator being based on the frequency domain basis subset corresponding to the precoded port. For example, 1106 may be performed by the PMI reception component 1344 of FIG. 13. In some aspects, the precoding matrix indicator may include the frequency domain basis subset based on the frequency domain basis restriction. In some aspects, the precoding matrix indicator may not include the frequency domain basis subset based on the frequency domain basis restriction. The precoding matrix indicator may include a frequency domain basis selection selected from the frequency domain basis subset.

In some aspects, the base station may receive a channel state information report based on the frequency domain basis subset from the UE. In some aspects, the channel state information report may include the frequency domain basis subset based on the frequency domain basis restriction. In some aspects, the channel state information report may not include the frequency domain basis subset based on the frequency domain basis restriction.

Figure 12:
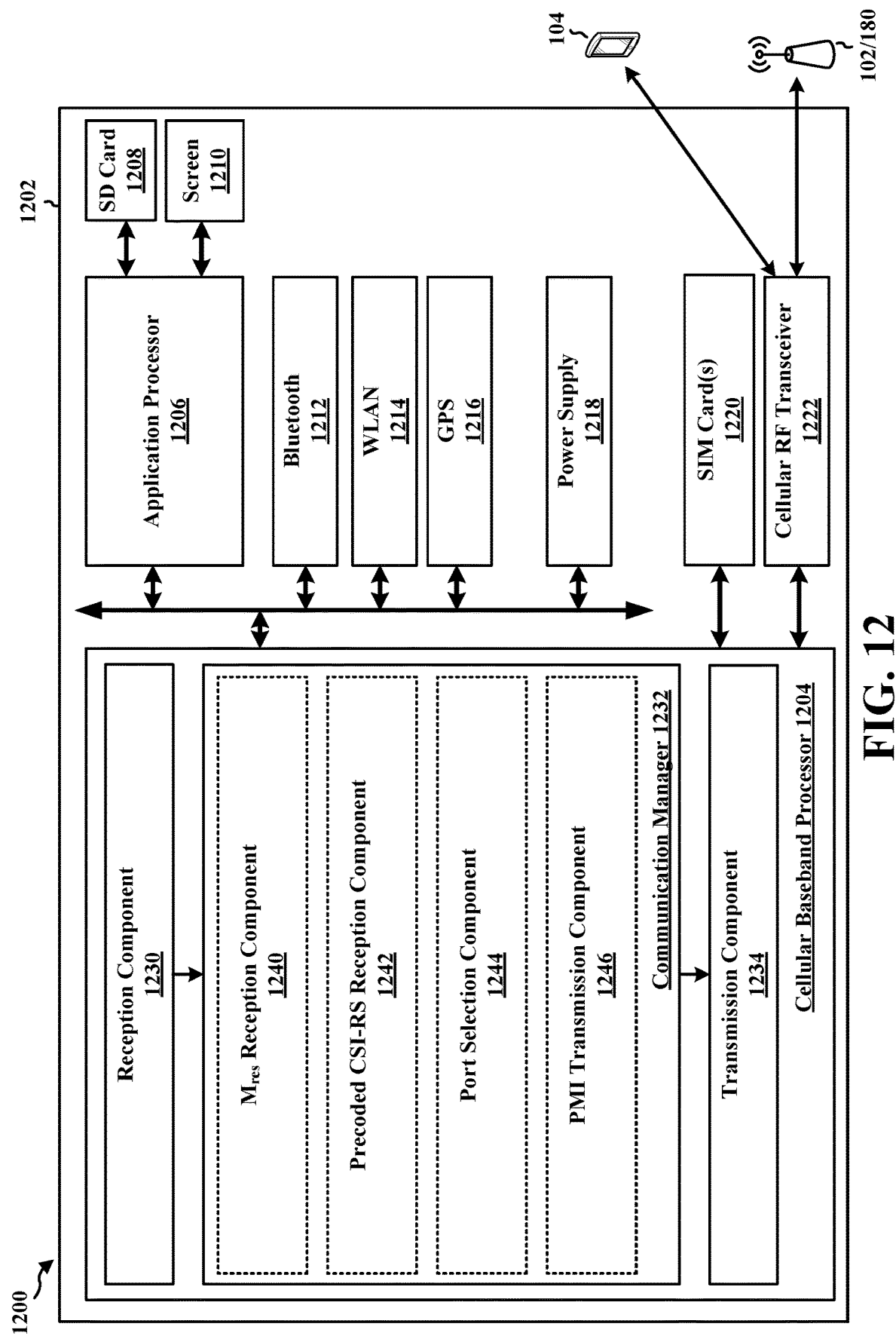
FIG. 12 is a diagram illustrating an example of a hardware implementation for an apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the above discussed additional modules of the apparatus 1202.

The communication manager 1232 includes a $M_{res}$ reception component 1240 that is configured to receive, from a base station, a frequency domain basis restriction indicating a frequency domain basis subset corresponding to a precoded port, the frequency domain basis subset being selected from a frequency domain basis set, e.g., as described in connection with 1002 of FIG. 10. The communication manager 1232 further includes a precoded CSI-RS component 1242 that is configured to receive, from the base station, a precoded CSI-RS corresponding to the precoded port, e.g., as described in connection with 1004 of FIG. 10. The communication manager 1232 further includes a port selection component 1244 that is configured to select the precoded port from a set of precoded ports based on the CSI-RS, e.g., as described in connection with 1006 of FIG. 10. The communication manager 1232 further includes a PMI transmission component 1246 that is configured to transmit a precoding matrix indicator to the base station identifying the precoded port, the precoding matrix indicator being based on the frequency domain basis subset corresponding to the precoded port, e.g., as described in connection with 1008 of FIG. 10.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for receiving, from a base station, a frequency domain basis restriction indicating a frequency domain basis subset corresponding to a precoded port, the frequency domain basis subset being selected from a frequency domain basis set; means for receiving, from the base station, a precoded channel state information (CSI) reference signal (CSI-RS) corresponding to the precoded port; means for selecting the precoded port from a set of precoded ports based on the CSI-RS; and means for transmitting a precoding matrix indicator to the base station identifying the precoded port, the precoding matrix indicator being based on the frequency domain basis subset corresponding to the precoded port. The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
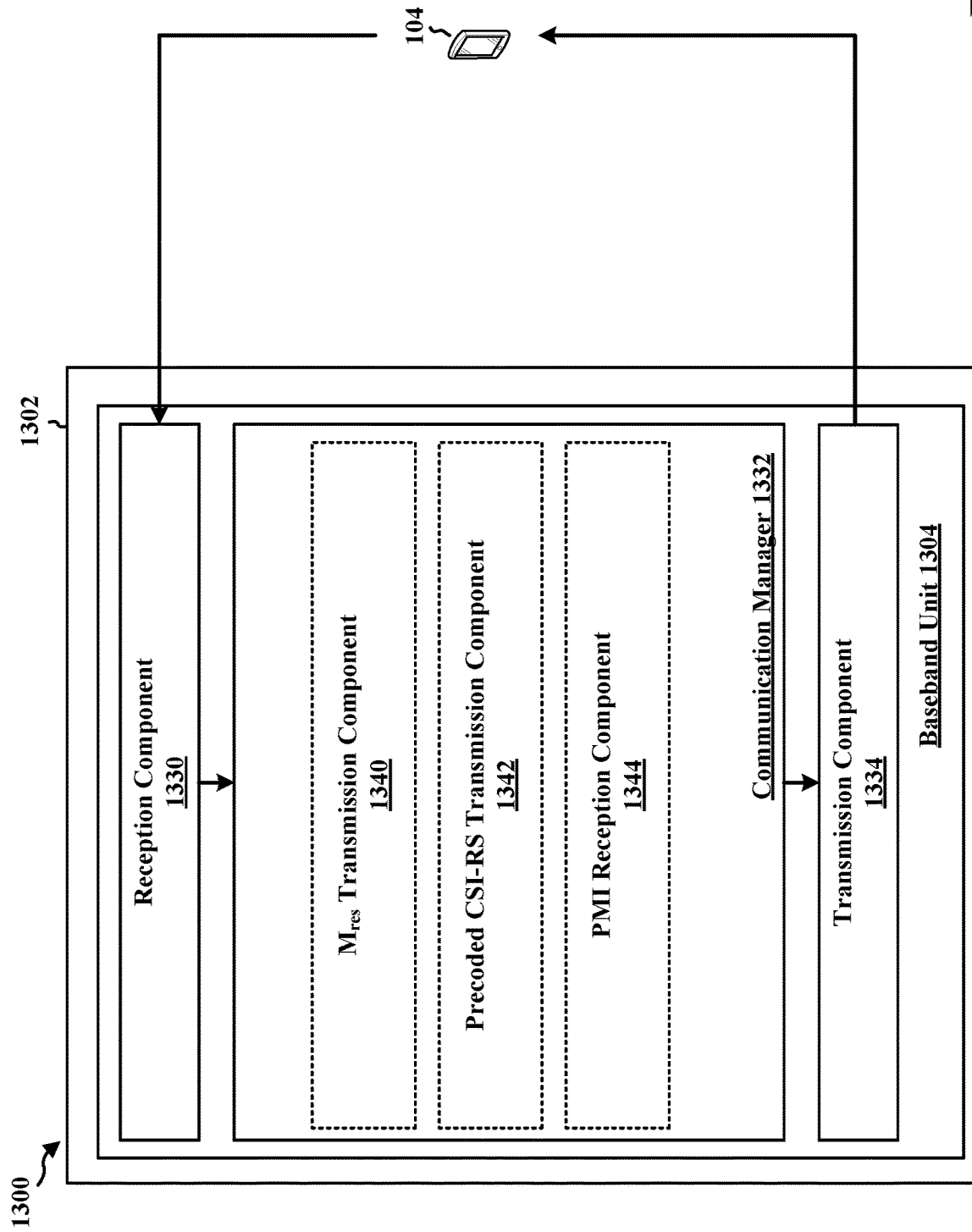
FIG. 13 is a diagram illustrating an example of a hardware implementation for an apparatus.

FIG. 13 is a diagram 1300 illustrating an example of a hardware implementation for an apparatus 1302. The apparatus 1302 is a BS and includes a baseband unit 1304. The baseband unit 1304 may communicate through a cellular RF transceiver with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the BS 310 and may include the memory 376 and/or at least one of the TX processor 316, the RX processor 370, and the controller/processor 375.

The communication manager 1332 includes a $M_{res}$ transmission component 1340 that is configured to transmit, to a UE from, a frequency domain basis restriction indicating a frequency domain basis subset corresponding to a precoded port, the frequency domain basis subset being selected from a frequency domain basis set, e.g., as described in connection with 1102 of FIG. 11. The communication manager 1332 further includes a precoded CSI-RS transmission component 1342 that is configured to transmit, to the UE, a precoded channel state information (CSI) reference signal (CSI-RS) corresponding to the precoded port, e.g., as described in connection with 1104 of FIG. 11. The communication manager 1332 further includes a PMI reception component 1344 that is configured to receive, from the UE, a precoding matrix indicator identifying the precoded port, the precoding matrix indicator being based on the frequency domain basis subset corresponding to the precoded port, e.g., as described in connection with 1106 of FIG. 11.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for transmitting, to a UE from, a frequency domain basis restriction indicating a frequency domain basis subset corresponding to a precoded port, the frequency domain basis subset being selected from a frequency domain basis set; means for transmitting, to the UE, a precoded channel state information (CSI) reference signal (CSI-RS) corresponding to the precoded port; and means for receiving, from the UE, a precoding matrix indicator identifying the precoded port, the precoding matrix indicator being based on the frequency domain basis subset corresponding to the precoded port. The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for".

What is claimed is:

1. A method of wireless communication of a user equipment (UE), comprising:
    transmitting, to a base station, information indicating a frequency domain basis subset;
    receiving, from the base station, a frequency domain basis restriction based on the transmitted information, the frequency domain basis restriction indicating the frequency domain basis subset corresponding to a precoded port, the frequency domain basis subset being selected from a frequency domain basis set, wherein the frequency domain basis subset is indicated by a table with rows corresponding to precoded ports and columns corresponding to a frequency domain basis such that entries in the table indicate which frequency domain basis are in the frequency domain basis subset for the precoded port corresponding to that row;
    receiving, from the base station, a precoded channel state information (CSI) reference signal (CSI-RS) corresponding to the precoded port;
    selecting the precoded port from a set of precoded ports based on the CSI-RS; and
    transmitting a precoding matrix indicator to the base station identifying the precoded port, the precoding matrix indicator being based on the frequency domain basis subset corresponding to the precoded port.

2. The method of claim 1, wherein the UE receives a plurality of frequency domain basis restrictions from the base station, wherein each frequency domain basis restriction of the plurality of frequency domain basis restrictions includes a frequency domain basis subset, and wherein a common frequency domain basis is included in each frequency domain basis subset.

3. The method of claim 1, further comprising transmitting a channel state information report based on the frequency domain basis subset to the base station.

4. The method of claim 3, wherein the channel state information report includes the frequency domain basis subset based on the frequency domain basis restriction.

5. The method of claim 3, wherein the channel state information report does not include the frequency domain basis subset based on the frequency domain basis restriction.

6. The method of claim 1, wherein the precoding matrix indicator includes a frequency domain basis selection selected from the frequency domain basis subset.

7. A method of wireless communication of a base station, comprising:
receiving, from a user equipment (UE), information indicating a frequency domain basis subset;
transmitting, to the UE, a frequency domain basis restriction based on the received information, the frequency domain basis restriction indicating the frequency domain basis subset corresponding to a precoded port, the frequency domain basis subset being selected from a frequency domain basis set, wherein the frequency domain basis subset is indicated by a table with rows corresponding to precoded ports and columns corresponding to a frequency domain basis such that entries in the table indicate which frequency domain basis are in the frequency domain basis subset for the precoded port corresponding to that row;
transmitting, to the UE, a precoded channel state information (CSI) reference signal (CSI-RS) corresponding to the precoded port; and
receiving, from the UE, a precoding matrix indicator identifying the precoded port, the precoding matrix indicator being based on the frequency domain basis subset corresponding to the precoded port.

8. The method of claim 7, wherein the base station transmits a plurality of frequency domain basis restrictions to the UE, wherein each frequency domain basis restriction of the plurality of frequency domain basis restrictions includes a frequency domain basis subset, and wherein a common frequency domain basis is included in each frequency domain basis subset.

9. The method of claim 7, further comprising receiving a channel state information report based on the frequency domain basis subset from the UE.

10. The method of claim 9, wherein the channel state information report includes the frequency domain basis subset based on the frequency domain basis restriction.

11. The method of claim 9, wherein the channel state information report does not include the frequency domain basis subset based on the frequency domain basis restriction.

12. The method of claim 7, wherein the precoding matrix indicator includes a frequency domain basis selection selected from the frequency domain basis subset.

13. A apparatus for wireless communication at a user equipment (UE), comprising:
a memory; and
at least one processor coupled to the memory and configured to:
transmit, to a base station, information indicating a frequency domain basis subset;
receive, from the base station, a frequency domain basis restriction based on the transmitted information, the frequency domain basis restriction indicating the frequency domain basis subset corresponding to a precoded port, the frequency domain basis subset being selected from a frequency domain basis set, wherein the frequency domain basis subset is indicated by a table with rows corresponding to precoded ports and columns corresponding to a frequency domain basis such that entries in the table indicate which frequency domain basis are in the frequency domain basis subset for the precoded port corresponding to that row;
receive, from the base station, a precoded channel state information (CSI) reference signal (CSI-RS) corresponding to the precoded port;
select the precoded port from a set of precoded ports based on the CSI-RS; and
transmit a precoding matrix indicator to the base station identifying the precoded port, the precoding matrix indicator being based on the frequency domain basis subset corresponding to the precoded port.

14. The apparatus of claim 13, wherein the at least one processor is further configured to receive a plurality of frequency domain basis restrictions from the base station, wherein each frequency domain basis restriction of the plurality of frequency domain basis restrictions includes a frequency domain basis subset, and wherein a common frequency domain basis is included in each frequency domain basis subset.

15. The apparatus of claim 13, wherein the at least one processor is further configured to transmit a channel state information report based on the frequency domain basis subset to the base station.

16. The apparatus of claim 15, wherein the channel state information report includes the frequency domain basis subset based on the frequency domain basis restriction.

17. The apparatus of claim 15, wherein the channel state information report does not include the frequency domain basis subset based on the frequency domain basis restriction.

18. The apparatus of claim 13, wherein the precoding matrix indicator includes a frequency domain basis selection selected from the frequency domain basis subset.

19. A apparatus for wireless communication at a base station, comprising:
a memory; and
at least one processor coupled to the memory and configured to:
receive, from a user equipment (UE), information indicating a frequency domain basis subset;
transmit, to the UE, a frequency domain basis restriction based on the received information, the frequency domain basis restriction indicating the frequency domain basis subset corresponding to a precoded port, the frequency domain basis subset being selected from a frequency domain basis set, wherein the frequency domain basis subset is indicated by a table with rows corresponding to precoded ports and columns corresponding to a frequency domain basis such that entries in the table indicate which frequency domain basis are in the frequency domain basis subset for the precoded port corresponding to that row;
transmit, to the UE, a precoded channel state information (CSI) reference signal (CSI-RS) corresponding to the precoded port; and
receive, from the UE, a precoding matrix indicator identifying the precoded port, the precoding matrix indicator being based on the frequency domain basis subset corresponding to the precoded port.

20. The apparatus of claim 19, wherein the at least one processor is further configured to transmit a plurality of frequency domain basis restrictions to the UE, wherein each frequency domain basis restriction of the plurality of frequency domain basis restrictions includes a frequency domain basis subset, and wherein a common frequency domain basis is included in each frequency domain basis subset.

21. The apparatus of claim 19, wherein the at least one processor is further configured to receive a channel state information report based on the frequency domain basis subset from the UE.

22. The apparatus of claim 21, wherein the channel state information report includes the frequency domain basis subset based on the frequency domain basis restriction.

23. The apparatus of claim 21, wherein the channel state information report does not include the frequency domain basis subset based on the frequency domain basis restriction.

24. The apparatus of claim 19, wherein the precoding matrix indicator includes a frequency domain basis selection selected from the frequency domain basis subset.

* * * * *